United States Patent [19]

Yoshida et al.

[11] 4,247,905
[45] Jan. 27, 1981

[54] MEMORY CLEAR SYSTEM

[75] Inventors: Yukihiro Yoshida, Ikoma; Toru Izaki, Nara; Toshiyuki Maegawa, Higashiosaka; Satoshi Tominaga, Yamatokoriyama, all of Japan

[73] Assignee: Sharp Kabushiki Kaisha, Osaka, Japan

[21] Appl. No.: 828,174

[22] Filed: Aug. 26, 1977

[30] Foreign Application Priority Data

Aug. 25, 1976 [JP] Japan ................... 51-102063

[51] Int. Cl.³ .............. G06F 3/02; G06F 13/00; G06F 13/06
[52] U.S. Cl. ...................... 364/900; 364/709
[58] Field of Search ............. 364/900, 200 MS File, 364/706, 709

[56] References Cited
U.S. PATENT DOCUMENTS

| | | | |
|---|---|---|---|
| 3,210,733 | 10/1965 | Terzian et al. | 364/200 |
| 3,346,853 | 10/1967 | Koster et al. | 364/900 |
| 3,839,630 | 10/1974 | Olander et al. | 235/156 |
| 3,900,722 | 8/1975 | Cochran | 364/707 |
| 3,976,975 | 8/1976 | Cochran | 364/900 |
| 4,034,349 | 7/1977 | Monaco et al. | 364/200 |

Primary Examiner—Gareth D. Shaw
Assistant Examiner—David Y. Eng
Attorney, Agent, or Firm—Birch, Stewart, Kolasch & Birch

[57] ABSTRACT

A memory clear method useful to clear up a plurality of words contained in a memory from a specific address to an address at the same time. An address register is provided for this purpose. In one preferred form, the address register is responsive to a [CX] key indicating a memory clear operation, a [,] key indicating start of the memory clear operation and [0] to [9] digit keys identifying a memory address for the memory clear operation.

8 Claims, 3 Drawing Figures

MEMORY CLEAR SYSTEM

BACKGROUND OF THE INVENTION

The present invention relates to a clear scheme for a memory having a capacity of a plurality of words in a programmable calculator for example, and more particularly to a method for clearing a specific number of words contained in a multi-word memory at the same time.

In the past, this type of the memory clear system has been divided into two categories; one was adapted to designate a memory address for a single word and clear away such designated word and the other was adapted to clear away the entire contents of a memory. However, when it was required to clear a specific number [n] of words, the clear operation had to be repeated n times and the operator had to identify the respective memory addresses for each of the n words each time the clear operation was carried out. This was extremely troublesome.

Moreoever, in case where n words were to be cleared by program instructions, a string of instructions for n steps was required. Therefore, the program unit was very complicated.

Accordingly, it is an object of the present invention to provide an improved clear system capable of clearing away a desired number of words from a memory at a time.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with the accompanying drawings, wherein:

DETAILED DESCRIPTION OF THE INVENTION

Figure 1:
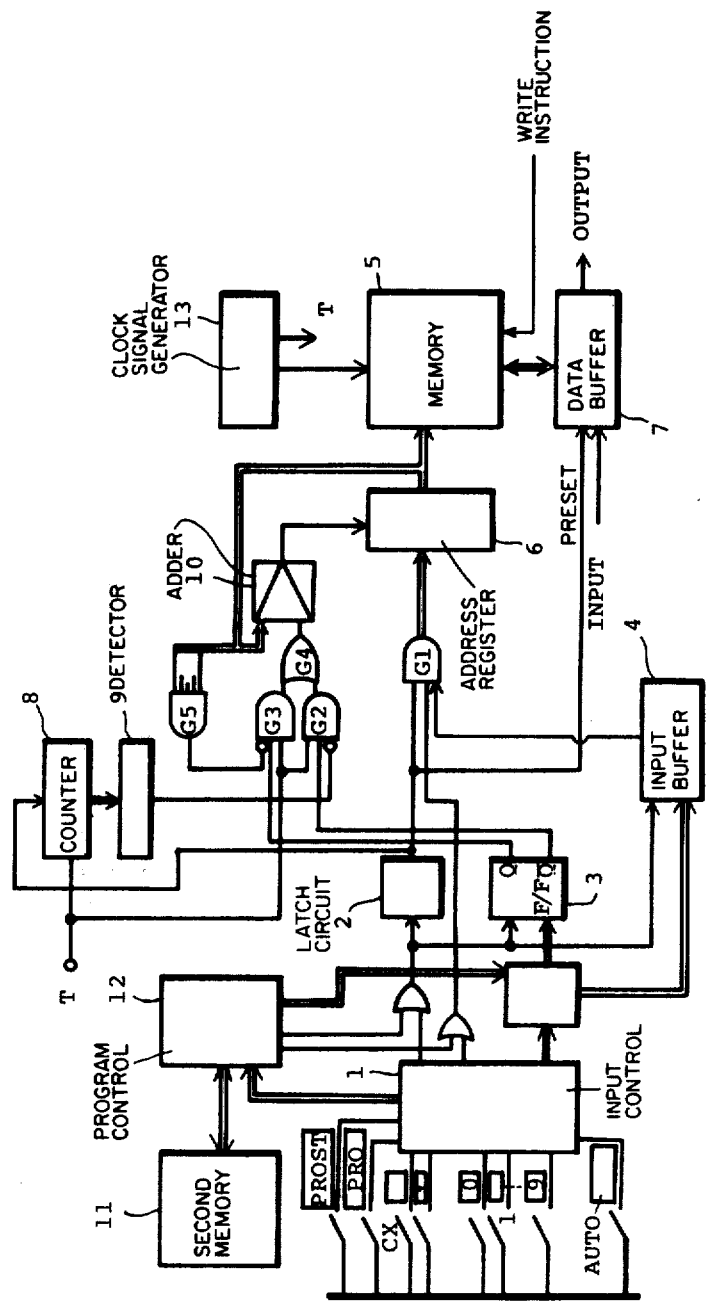
FIG. 1 is a block diagram showing one preferred form of the present invention.

Referring now to FIG. 1 showing one preferred form of the present invention, a [CX] key is the one that indicates memory clear operation; a [,] key is the one that indicates start of the memory clear operation; and [0] to [9] digit keys are the ones that designate memory addresses for the purposes of the memory clear operation.

These functional and digit keys are coupled to an input control 1 which in turns decodes operations of these keys into unique code signals corresponding to the operated keys.

An output lead from the input control 1 for the [CX] key is connected with a latch circuit 2 and a set side of a flip-flop 3 and a clear terminal of an input buffer 4. Upon depression of the [CX] key, its key signal enters into the latch circuit 2 and places the flip-flop 3 into the set state and clears the input buffer 4.

An output lead from the input control 1 for the [0] to [9] digit keys is connected to the input buffer 4 and a reset terminal of the flip-flop 3 so that numerals designated by the digit keys are introduced and stored into the input buffer 4 and the flipflop 3 is shifted into the reset state. Inputs to an AND gate $G_1$ are the output of the latch circuit 2 and the output of the input buffer 4, the output of the AND gate $G_1$ is connected to an address register 6 of a memory 5.

The memory 5 has capacity to store a predetermined number of words and thus the stores the respective words with unique addresses. These addresses of the words are designated by the address register 6. Data introduced via a data buffer 7 is written at its designated address in a write mode, while data at the designated address is given access to the data buffer 7 in a read mode.

Therefore, when the [CX] key, the digit keys and the [,] key are manually operated in this order, the AND gate $G_1$ is conducting such that address designating information input via the digit keys is loaded into the address register 6 through the gate $G_1$ whereby the address register 6 stores the designated address information. The input buffer 4 and the AND gate $G_1$ operate as control means for clearing the designated address.

The output of the latch circuit 2 is connected to a clear terminal of the above-mentioned data buffer 7 such that the contents of the data buffer 7 are cleared away when the address register 6 stores the designated address. On the other hand, the output of the latch circuit 2 is connected to a preset circuit for a counter circuit 8. The counter circuit 8 is set to a desired value (n) by the output of the latch circuit 2 and is decremented once each time a clock signal T is received.

A detector means 9 is provided for determining whether the contents of the counter circuit 8 reaches "0", such detection output (logic "1") being inverted and introduced into an AND gate $G_2$. The AND gate $G_2$ receives the clock signal T, the reset output ($\bar{Q}$ output) of the flip-flop 3 and an inversed signal of the zero detection output, while it provides its output to an input of an adder 10 via an OR gate $G_4$. An AND gate $G_3$ receives the clock signal T, the set output (Q output) of the flip-flop 3 and an inverted signal of the output of an AND gate $G_5$, while it provides its output to the input of the adder 10 via the OR gate $G_4$.

The adder 10 receives the output of the OR gate $G_4$ and the output of the address register 6, the output of the adder 10 is returned back to the address register 6. It will be noted that the AND gate $G_5$ is adapted to be in the conducting state when the address register 6 indicates the last address of the memory.

With such an arrangement, when the [CX] key, the digit keys and the [,] key are sequentially operated, the counter circuit 8 is placed into this set state. Under the circumstance, the AND gate $G_2$ becomes conducting upon every receipt of the clock signal T because the detecting means 9 provides no output and the flipflop 3 is forced into the reset state. The output of the gate $G_2$ arrives at the adder 10, incrementing by one the contents of the address register 6. The results of the adder 10 are stored in the address register 6. In this manner, the address register 6 is sequentially advanced. If the detecting means 9 senses the "0" state in the counter circuit 8, then the AND gate $G_2$ is rendered non-conducting to prevent the address register 6 from further advancing.

On the other hand, when the [CX] key and the [,] key are sequentially operated, the flip-flop 3 is in the set state and the AND gate $G_5$ is conducting so that the AND gate $G_3$ is conducting each time the clock signal T is received. The output of the gate G₃ is introduced into the adder 10 and accordingly the adder 10 adds "1" to the contents of the address register 6. The results of the addition are introduced into the address register 6. As a consequence, the address register 6 is sequentially advanced. When the address register 6 indicates the last address of the memory, the AND gate G₅ is turned on to render the AND gate G₃ non-conducting. Accordingly, the address register 6 is inhibited to further advance.

Eventually, the implementation consisting of the flip-flop 3, the counter circuit 8, the detecting means 9, the gates G₂-G₅ and the adder 10 provides a control for advancing operation of the address register 6 in response to the [,] key (the clear start key).

In the drawings, 11 represents a Random Access Memory (RAM) and 12 represents a RAM control. In the case where the operations of the [CX] key, the digit key and the [,] key are executed by a program, the ROM 11 provides proper program instructions.

The following gives a full detail of the events in the abovementioned operation.

Assume now that the memory clear key [CX], the digit key [2] and the clear start key [,] are sequentially operated. First of all, a key signal developed by operation of the key [CX] is input to the latch circuit 2 and the output of the latch circuit 2 is held for a while. That key signal also sets the flip-flop 3 and clears the input buffer 4. Thereafter, upon operation of the digit key [2] the flip-flop 3 is reset and numeral information "2" is introduced and contained within the input buffer 4. In addition, as soon as the clear start key [,] is depressed, the AND gate G₁ conducts so that the address register 6 is loaded with "2". The address register 6 designates the address "2" of for the memory 5. In this instance, the output of the latch circuit 2 clears the data buffer 7 to the "0" state. A region of the memory 5 designated by the address "2" is rewritten to "0" (that is, cleared).

Meanwhile, the counter 8 is preset with the value of n because of the output of the latch circuit 2. For example, when n=10, the counter 8 is set with "10" and the output of the detecting means 9 is "0". Therefore, the AND gate G₂ is conducting upon receipt of the timing signal T after operation of the [,] key. The adder 10 adds "1" to the contents of the address register 6 and transfers the results back into the address register 6. For this reason, the contents of the address register 6 are incremented by one thereby designating an address "3" for of the memory 5. The contents of the counter 8 is decremented by one in response to the timing signal T. A region of the memory 5 corresponding to the address "3" is cleared away and then the address register 6 is advanced step-by-step at each receipt of the timing signal T, thereby clearing respectively regions successive of the memory 5.

If the tenth timing signal T is received, the counter circuit 8 assumes "0" and the detecting means 9 becomes operable to provide the output "1". As a result, the gate G₂ is non-conducting thereby inhibiting the address register 6, and therefore, operating to assign the addresses "2" through "12" to be cleared in the memory 5.

Next, in case where the [CX] key and the [,] key are sequentially operated, the key signal from operation of the [CX] key is inputted into the latch circuit 2 as mentioned above so that the flip-flop 3 is set and the input buffer 4 is cleared. Then, depression of the clear start key [,] renders the AND gate G₁ conductive and places "0" into the address register 6. At this time the output of the latch circuit 2 clears the data buffer 7. A region of the memory 5 assigned to the address "0" is cleared.

Upon excitation by the incoming timing signal, T, the AND gate G₃ conducts and the contents of the address register 6 are incremented by one through the adder 10. The results are returned back into the address regsiter 6. Therefore, the contents of the address register 6 are one incremented to designate the address "1" for the memory 6, thereby clearing that region of the memory.

After that, the AND gate G₃ conducts each time the timing signal is received. The address register 6 is sequentially advanced by the resulting successive incrementations of the adder 10 in a manner to clear its corresponding regions of the memory 5.

When the contents of the address register 6 show the last address of the memory 5, the AND gate G₅ is conducting and hence the AND gate G₃ is non-conducting. The address register 6 is prevented from advancing. Eventually, this results in clearing the entire memory 6.

Figure 2:
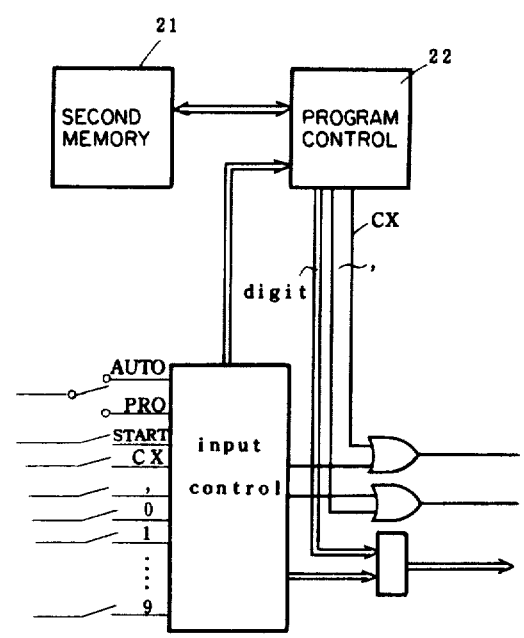
FIG. 2 is a block diagram showing another preferred form of the present invention.
Figure 3:
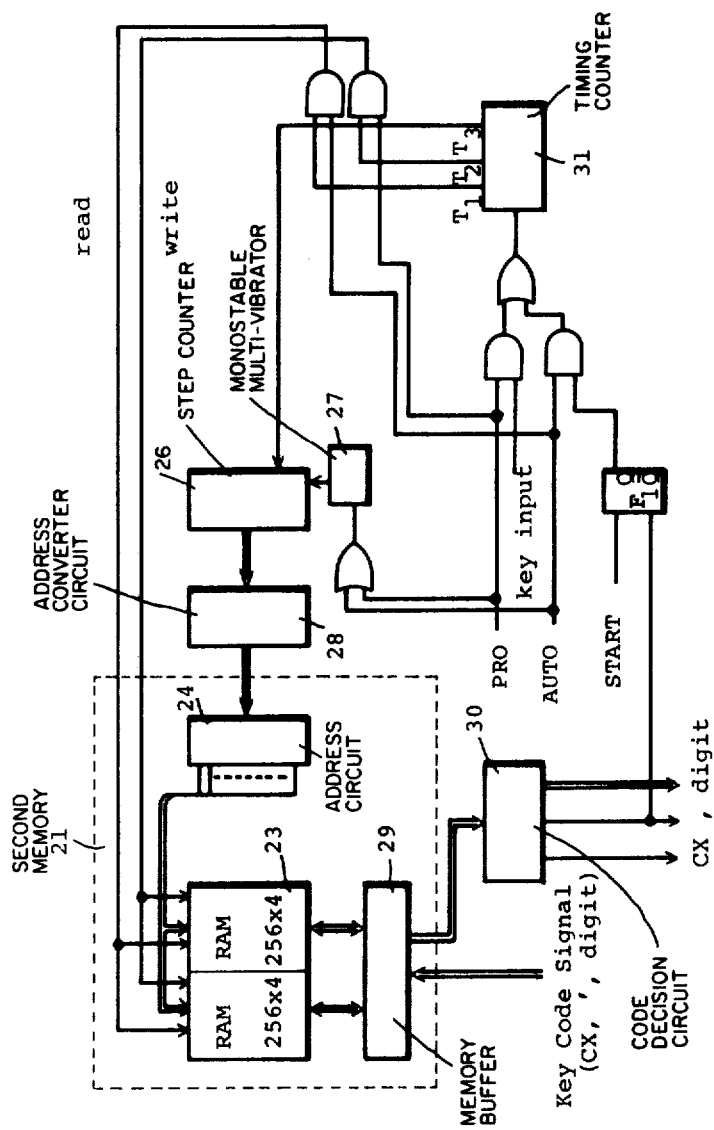
FIG. 3 is a detailed circuit showing a program control used with the embodiment of FIG. 2.

Another embodiment which executes the clear method of the present invention by a string of program instructions, is illustrated in FIGS. 2 and 3.

There are illustrated a program storage 21 consisting of a memory such as a RAM and a program control 22 which controls the program storage 21 in accordance with certain key operations. Keys useful to program execution are a PRO key which instructs writing of code signals from respective keys into the program storage, and an AUTO key which instructs execution of a program contained in the program storage. The PRO key and the AUTO key may be set up by a conventional slide switch for example. As well, there is a START key for instructing the program to start executing.

FIG. 3 shows details of the program control 22. The program storage 21 comprises 2 RAMs 23 manufactured by Intel Co. under 2101A in the form of 256×4×2 and each step of the program is set up by 8 bits to store the code signals representative of the respective keys. The Rams 23 are supplied with an address signal line from an address circuit 24, a read signal line providing an output when information has been read from the RAMs, and a write signal line providing an output when information has been written into the RAMs.

In addition, a memory buffer 29 of an 8 bit construction is provided to which information is addressed and read from the Rams 23 when developing the read signal and from which information is written to the RAMs 23 when developing the write signal.

The program control has a step counter 26 which counts the steps of the program each time the read or write is executed for the program storage.

When the PRO key or the AUTO key is manually operated, a monomulti 27 develops an output to reset the step counter to the initial state. The output of the step counter is supplied to an address converter circuit 28 consisting of a conventional decoder, etc., for conversion into its corresponding address.

The memory buffer 29 in the key memory storage stores the code signals representative of the respective keys in the PRO (program) mode. Further, the memory buffer 29 contains information read from the RAMs which in turn is supplied to a code decision circuit 30. A timing counter 31 generates timing signals which operate respective logic circuits in the program control.

The timing counter 31 starts operating and produces a signal $T_1$ effective to output the read signal when any of the key inputs is developed in the PRO mode. Subsequently, a signal $T_2$ is developed to output the write signal. A third signal $T_3$ is developed to increment the step counter.

In the AUTO mode, upon the operation of the START key the flip-flop $F_1$ is set to render the timing counter operable to develop sequentially $T_1$, $T_2$, $T_3$... This continues until the flip-flop $F_1$ is reset.

When the PRO mode is switched on the step counter is reset to set up the initial step. The key signals are stored within the memory buffer and the signals $T_1$, $T_2$, $T_3$ are sequentially produced by the timing counter. The key code signals are stored at the address position corresponding to each of the steps.

In this manner, the operations of the respective keys are stored in the program storage. When the program is next executed, the AUTO mode should be established. Upon the START key the flip-flop is set and the timing signals $T_1$, $T_2$, $T_3$ are sequentially developed to read out the respective instructions.

While only certain embodiments of the present invention have been described, it will be apparent to those skilled in the art that various changes and modifications may be made therein without departing from the spirit and scope of the invention as claimed.

What is claimed is:

1. A system for automatically and selectively clearing all or a portion of a memory means having a capacity to store a plurality of words comprising:

first means for instructing said system to begin a memory clear operation;

second means for designating a starting address within said plurality of the words for the purpose of said memory clear operation;

means responsive to said second means for setting a memory address register at said designated starting address;

third means for entering a value n into said system representing the number of said plurality of words in said memory means undergoing clearing;

fourth means for instructing start of the clear operation; and control means for automatically and sequentially advancing the starting address in the address register a number of times equal to said value n entered into said system via said third means in response to instructing the clear operation via said fourth means, thereby automatically and selectively clearing a predetermined number n of said plurality of words in said memory means extending from said designated address to an end address in response to said first, second and fourth means, said control means including circuit means responsive to the presence and absence of actuation of said second means prior in sequence to said fourth means to automatically and selectively clear a portion or all, respectively, of said memory means.

2. A system of clearing a memory in accordance with claim 1 wherein said circuit means included within said control means automatically clears a portion of said memory means in response to the presence or actuation of said second means, said circuit means automatically clearing all of said memory means in response to the absence of actuation of said second means, said first means being actuated prior in sequence to said second means, said second means being actuated prior in sequence to said third means.

3. A circuit means for selectively and automatically clearing all or a portion of a plurality of words from a memory in response to an initial series of input instructions comprising:

a first memory means;

first signal generating means for generating a first control signal indicating that a memory clear operation for said first memory means is desired;

second signal generating means for generating a second control signal designating a starting address in said first memory representing the address of the first word in said plurality of words to be cleared;

third signal generating means for generating a third control signal indicating that said memory clear operation should begin;

a memory address register for said first memory means;

logic control means responsive to said first, second and third control signals for setting said memory address register to a specific value equal to said starting address;

said memory address register generating a first address output signal designating a specific location in said first memory means corresponding to said starting address;

temporary storage means for storing a specific number in a temporary storage location, said specific number being equal to the number of words in said first memory means which constitute said plurality of words being cleared by said memory clear operation; and clock means for generating a clock signal including a plurality of periodically spaced pulses;

said temporary storage means generating a said specific number of output signals in response to excitation by corresponding pulses of said clock signal;

said logic control means incrementing said memory address register by a set value in response to each said plurality of output signals from said temporary storage means thereby causing said memory address register to generate a sequence of incremental memory address signals indicative of the additional addresses in said first memory means corresponding to said plurality of words undergoing said memory clear operation; a said sequence of incremental memory address signals being generated each time said memory address register is incremented by a said plurality of output signals from said temporary storage menas, said first memory means being cleared at a series of additional locations in accordance with the address locations indicated by each said series of incremental memory address signals, said logic control means including sub-circuit means responsive to the presence and absence of actuation of said second signal generating means and prior in sequence to said third signal generating means to selectively clear a portion and all, respectively, of said first memory means.

4. A circuit means for clearing all or a portion of a plurality of words from a memory according to claim 3, wherein said first, second and third control signal generating means further comprises:

manual selection means for manually entering a set of key code signals, said set of key code signals generating a memory clear function enabling signal, enabling said memory clear operation, designating a starting address and generating a memory clear operation commencement signal indicating the commencement of said memory clear operation;

automatic selection means responsive to said set of key code signals entered via said manual selection means for selecting key storage means for storing said set of key code signals entered via said manual selection means; and input control means responsive to actuation of said manual selection means and said automatic selection means for generating a first set of said control signals and an energizing signal, respectively, said first set of control signals representing said set of key code signals manually entered via said manual selection means and representing said first, second and third control signals respectively;

said energizing signal energizing said key storage means thereby storing said set of key code signals therein, said key storage means generating a second set of said control signals corresponding to said first set of control signals.

5. A circuit means for clearing all or a portion of a plurality of words from a memory, in accordance with claim 4, wherein said automatic selection means utilized in conjunction with said manual selection means comprises:

PRO key means for writing said set of key code signals into said key storage means; and AUTO key means utilized subsequent to actuation of said PRO key means for placing said key storage means in an automatic mode thereby reading said set of key code signals from said key storage means for subsequent clearing of a portion or all of said first memory means through said control means.

6. A circuit means for clearing all or a portion of a plurality of words from a memory, in accordance with claim 5, wherein said automatic selection means utilized in conjunction with said manual selection means further comprises:

means responsive to actuation of said PRO key means and said AUTO key means for reading said set of key code signals from said key storage means, said set of key code signals being read from said key storage means in the form of said second set of control signals.

7. A system circuit means for clearing all or a portion of a plurality of words from a memory in accordance with claim 3, wherein said temporary storage means comprises:

counter means responsive to said first signal for temporarily storing said specific number, said number representing the number of words constituting said plurality of words being cleared by said memory clear operation, said counter means generating said plurality of output signals in response to excitation by said plurality of spaced pulses constituting said clock signal, the first output signal of said counter means representing the maximum number of words which constitute said plurality of words undergoing said memory clear operation, said counter means being decremented by a value of one in response to excitation by each of said clock signal pulses thereby generating a series of said output signals, said specific number in said counter means being gradually decreased in value in response to generation of said series of output signals said gradually decreased specific number in said counter means being indicative of a fewer number of said plurality of words remaining to undergo said memory clear operation; and wherein said logic control means further includes:

detector means responsive to an output from said counter means for detecting one of said output signals from said counter means, said one of said output signals indicative of a zero count of said counter means thereby indicating that all of said plurality of words in said memory means have been cleared, said detector means generating a zero detect output signal; and adder means responsive to an output from said detector means, to said first signal and to said clock signal for adding a value of one to said address register in response to excitation by said clock signal and said first signal thereby incrementing said address register each time said clock signal and said first signal excites said adder means;

said address register generating an output signal each time said address in said register is incremented thereby clearing that portion of said memory represented by said incremented address in said address register.

8. A circuit means for clearing all or a portion of a plurality of words from a memory in accordance with claim 7, wherein said logic control means further comprises:

gate means responsive to an output from said memory address register for generating a zero gated output signal when a last incremented address is set into said memory address register, said last incremented address representing the address of the last one of said plurality of words in said first memory means;

said adder means being rendered inoperative in response to excitation by said zero gated output signal from said gate means and by said zero detect output signal from said detector means; and said adder means no longer incrementing said memory address register when the last address of the last word of said plurality of words is loaded into said memory address register.

* * * * *